United States Patent
Zabel et al.

(10) Patent No.: US 6,975,714 B1
(45) Date of Patent: Dec. 13, 2005

(54) METHOD AND APPARATUS FOR DEFEATING PREDICTIVE TELEMARKETING SYSTEMS BY SIMULATING FACSIMILE MACHINES OR MODEMS UPON ANSWERING INCOMING CALLS

(75) Inventors: John R. Zabel, Canton, NY (US); George T. Kittle, Centerville, VA (US)

(73) Assignee: Enginuity Technologies Group, Inc., Reston, VA (US)

( * ) Notice: Subject to any disclaimer, the term of this patent is extended or adjusted under 35 U.S.C. 154(b) by 114 days.

(21) Appl. No.: 10/392,795

(22) Filed: Mar. 19, 2003

Related U.S. Application Data

(60) Provisional application No. 60/366,445, filed on Mar. 19, 2002.

(51) Int. Cl.[7] .......................... H04M 1/663; H04M 3/42

(52) U.S. Cl. ............ 379/199; 379/207.15; 379/210.03; 379/361

(58) Field of Search .............................. 379/188, 196, 379/197, 198, 199, 200, 201.01, 210.02, 379/210.03, 266.07, 266.08, 353, 361, 207.15

(56) References Cited

U.S. PATENT DOCUMENTS

| | | | |
|---|---|---|---|
| 5,146,472 A * | 9/1992 | Hallman | 375/222 |
| 5,920,623 A * | 7/1999 | Bensman et al. | 379/361 |
| 6,775,364 B2 * | 8/2004 | Knox | 379/142.01 |

* cited by examiner

*Primary Examiner*—Harry S. Hong
(74) *Attorney, Agent, or Firm*—Hill Law Firm

(57) ABSTRACT

A method and apparatus that generate a 2100 Hz answer tone, similar to the answer tones sent by facsimile machines and modems, upon answering an incoming call. This causes predictive telemarketing dialers to remove the telephone number from their databases.

2 Claims, 1 Drawing Sheet

METHOD AND APPARATUS FOR DEFEATING PREDICTIVE TELEMARKETING SYSTEMS BY SIMULATING FACSIMILE MACHINES OR MODEMS UPON ANSWERING INCOMING CALLS

This Application claims the benefit of U.S. Provisional Application No. 60/366,445, filed 19 Mar. 2002, titled "Method and Apparatus for Defeating Predictive Telemarketing System by Simulating Fax or Modems Upon Answering Incoming Phone Calls."

BACKGROUND OF THE INVENTION

1. Field of the Invention

The present invention relates to telemarketing. In particular the preset invention relates to defeating predictive telemarketing systems.

2. Description of Related Art

Since Telemarketers have used predictive dialer to automate the calling process the amount of telemarketing call to residences has increased. People receiving these calls in their residences now want a way to eliminate or reduce these unwanted calls. The problem has existed since telemarketers have used predictive dialers.

One solution to the problem is to use of a 914 Hz signal to simulate a Special Information Tone to defeat the predictive dialer by making it respond as if the phone number dialed is not in service. This solution is covered by the TELEZAPPER, which has been offered for sale since the last half of 2001. The TELEZAPPER is covered by U.S. Pat. No. 5,920,623, which discloses a Special Information Tone to defeat the telemarketer.

SUMMARY OF THE INVENTION

There is a need for an improved method of defeating predictive telemarketing systems.

Therefore, it is an object of the present invention to provide a method and apparatus for defeating predictive telemarketing systems.

This object is achieved by providing a method and apparatus that generate a 2100 Hz answer tone, similar to the answer tones sent by facsimile machines and modems upon answering. This causes the predictive dialer to remove the telephone number from its database.

DETAILED DESCRIPTION OF THE PREFERRED EMBODIMENT

The present invention uses a 2100 Hz answer tone, similar to the tones used by facsimile machines and modems, to defeat predictive telemarketing dialers. The 2100 Hz answer tone receives special treatment from the predictive telemarketing system, because telemarketers are typically interested in talking to a live person. The invention gives the impression that the telemarketing call was completed to a facsimile machine or modem, which is of no interest to most telemarketers. Instead of signaling the line is not in service, the present invention gives the impression that the call was completed to a facsimile machine or modem. The predictive dialer will then remove the dialed number from its database.

Figure 1:
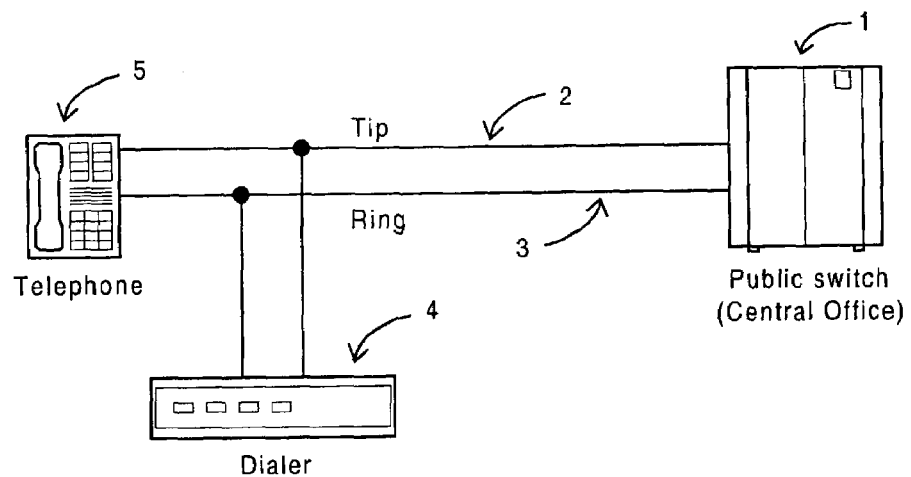
FIG. 1 is a schematic of an installation of a parallel dialer on a subscriber line according to the present invention.

In order to facilitate a complete understanding of the context of the invention, FIG. 1 shows a typical installation of a parallel dialer on a subscriber line. It should be noted that a serial dialer can be used in place of the parallel dialer. A telephone central office 1 is connected by telephone line, comprising tip wire 2 and ring wire 3, to a subscriber telephone set 5, which may comprise a plurality of subscriber sets. A dialer 4 is connected in parallel with subscriber set 5 to the telephone line.

Figure 2:
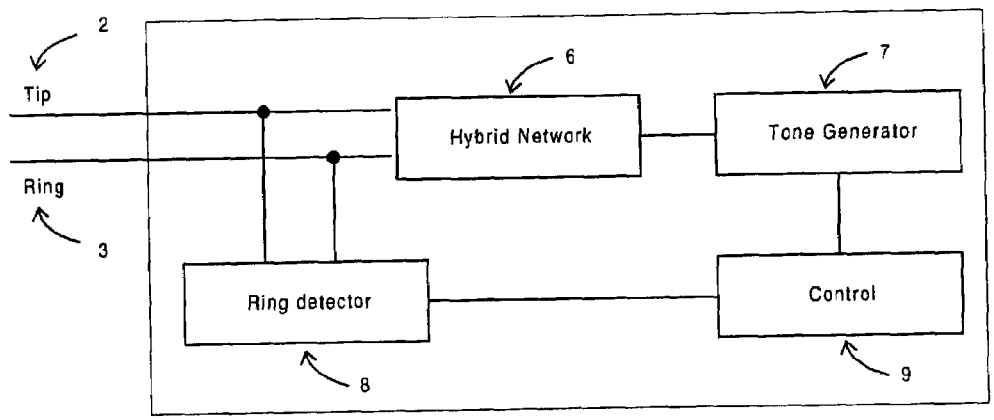
FIG. 2 is a block diagram of the dialer of FIG. 1.

Referring now to FIG. 2 in the drawings, a block diagram of dialer 4 is illustrated. A hybrid network 6 provides two to four wire conversion, sending the transmit audio from a tone generator 7 to the telephone line, which comprises tip wire 2 and ring wire 3.

A ring detector 8 is used to monitor the current line condition and to detect the presence of ringing voltage on the telephone line. A control 9 is employed to poll the ring detector 8 and to determine whether the call state on the telephone line is incoming or outgoing.

When control 9 determines that the call is an incoming call, control 9 enables a tone generator 7 to send a 2100 Hz answer tone to the hybrid network 6, which couples the tone to the telephone line. The sending of the 2100 Hz answer tone back over the telephone line gives the impression that the call was completed to a facsimile machine or modem, which is of no interest to most telemarketers. The predictive dialer then removes the dialed number from its database.

The method and apparatus of the present invention works in conjunction with the user's telephone line to defeat predictive dialers used by telemarketing groups that remove dialed telephone numbers from said dialer in response to detecting V.25 answer tones. The apparatus of the present invention includes tone generator 7 under control of a microprocessor (not shown) that generates a 2100 Hz answer tone used in the first part of the V.25 answer protocol, an offhook detector to determine when the line is in use, ring detector 8 to determine incoming calls, and a control 9 in communication with the offhook detector and ring detector 8 that sends the answer tone to the telephone line in response to all answered incoming calls on the telephone line.

In an alternate embodiment, control 9 generates the 2100 Hz answer tone. It should be understood that tones of other frequencies, similar to other facsimile machines, modems, and other electronic telecommunication devices, may be used instead of the 2100 Hz answer tone.

In another alternate embodiment, the generation of the answer tone on incoming and outgoing calls can be used to eliminate the need for ring detector 8.

The present invention is particularly well suited for the residential market, including the small office, home office, and small business market to allow users to avoid calls from telemarketers. It will be appreciated that the present invention may be integrated with, sold with, or bundled with independent dialer devices that provide automatic transport to a specified 10-10-XXX carrier. This makes the present invention an attractive upsell to the dialer market.

What is claimed is:

1. An apparatus in communication with a telephone line for defeating predictive dialing telemarketing systems that remove telephone numbers from their systems in response to 2100 Hz answer tones, the apparatus comprising:
   a signal generator that generates a 2100 Hz answer tone;
   a ring detector;
   an offhook detector;

a controller in communication with the ring detector and the offhook detector that sends the 2100 Hz answer tone in response to answered incoming calls on the telephone line;

a CLI detector; and a controller that is responsive to the CLI detector that only sends the 2100 Hz answer tone upon receipt of CLI data representative of a private, blocked, or unknown caller.

2. An apparatus in communication with a telephone line for defeating predictive dialing telemarketing systems that remove telephone numbers from their systems in response to 2100 Hz answer tones, the apparatus comprising:

a signal generator that generates a 2100 Hz answer tone;

a ring detector;

an offhook detector;

a controller in communication with the ring detector and the offhook detector that sends the 2100 Hz answer tone in response to answered incoming calls on the telephone line;

a CLI detector;

a database recorded in an electronic memory device to store preferred callers; and a controller that is responsive to the CLI detector that does not send the 2100 Hz answer tone upon receipt of CLI data that matches data residing in the database.

* * * * *